United States Patent [19]

Karlecik-Maier

[11] Patent Number: 5,479,332
[45] Date of Patent: Dec. 26, 1995

[54] SYSTEM AVOIDING REGULATOR DETACHMENTS IN QUASI-STEADY OPERATION OF ADC POWER TRANSMISSION LINE

[75] Inventor: Franz Karlecik-Maier, Höchstadt, Germany

[73] Assignee: Siemens Aktiengesellschaft, München, Germany

[21] Appl. No.: 142,442

[22] PCT Filed: May 27, 1991

[86] PCT No.: PCT/DE91/00452

§ 371 Date: Nov. 24, 1993

§ 102(e) Date: Nov. 24, 1993

[87] PCT Pub. No.: WO92/22118

PCT Pub. Date: Dec. 10, 1992

[51] Int. Cl.$^6$ .......................................... H02J 3/36
[52] U.S. Cl. ............................ 363/37; 363/35; 363/51
[58] Field of Search ................................ 363/35, 37, 51, 363/79

[56] References Cited

U.S. PATENT DOCUMENTS

| | | | |
|---|---|---|---|
| 4,517,634 | 5/1985 | Sakai | 363/65 |
| 4,649,466 | 3/1987 | Rogowsky | 363/65 |
| 4,888,674 | 12/1989 | Weibelzahl et al. | 363/65 |

FOREIGN PATENT DOCUMENTS

| | | |
|---|---|---|
| 0197352 | 10/1986 | European Pat. Off. . |
| 0321823 | 6/1989 | European Pat. Off. . |
| 2518910 | 8/1976 | Germany . |
| 3326947 | 7/1985 | Germany . |

Primary Examiner—A. D. Pellinen
Assistant Examiner—Y. Jessica Han
Attorney, Agent, or Firm—Kenyon & Kenyon

[57] ABSTRACT

In order to improve the operation of a dc transmission unit (GÜ) between a rectifier (R) and an inverter (I), an extinction angle signal (LS) of the inverter (I) is fed as reference variable to the rectifier regulator (RR). A current signal (ID) of the dc transmission unit (GÜ) is preferably fed to an inverter regulator (IR) of the inverter (I) as input variable. In addition, the current signal (ID) can be fed as input variable to the rectifier regulator (RR) for the start-up and/or in the event of a malfunction. Another solution consists of a circuit arrangement (S1, S2, S3) for the carrying out of the method.

14 Claims, 4 Drawing Sheets

SYSTEM AVOIDING REGULATOR DETACHMENTS IN QUASI-STEADY OPERATION OF ADC POWER TRANSMISSION LINE

BACKGROUND OF THE INVENTION

The present invention relates generally to methods and circuits for transmission of direct-current, and more particularly to a method and a circuit for transmission of DC current between at least one rectifier and at least one inverter.

DC transmission systems are often used to transmit electric energy between two non-synchronizable alternating voltage power lines use. DE-AS 25 18 910 discloses a DC transmission system, in which a rectifier is connected to the one alternating voltage power line. The rectifier produces a DC current which is fed to an inverter. The latter, in turn, is connected to the second alternating voltage power line. The two alternating voltage power lines are then coupled to each other via a DC connection.

Various regulating methods are used to operate such DC transmission systems. A large number of customary methods of regulation are based on the marginal current method. In the marginal current method, both rectifier and inverter have a current regulator, in which the characteristic curves are shifted from each other by a marginal current. In addition, in this method the inverter has a so-called extinction angle regulator. EP O 197 352 A1 discloses a circuit which has a current regulator for the converter present in rectifier operation and an extinction angle regulator for the converter which is present in inverter operation. The current regulator of the rectifier receives as input signal the desired current value Id*. Id* and the extinction angle value γ are produced by a control and calculation member to which Udn, Ido, P, P* and γ (extinction angle signal of the inverter) are fed.

In the marginal current method, during steady-state operation the rectifier determines the DC current and the inverter determines the DC voltage on the transmission path. Considered from the standpoint of the DC regulating circuit of the rectifier, a disturbance in the power line (decrease or increase of the three-phase current voltage) on the inverter can be amplified by the extinction angle regulator. Furthermore, considered from the standpoint of the inverter-side power line, the extinction angle regulator has a poor du/dq behavior since it does not counteract a change in three-phase voltage. In order to eliminate this disadvantageous behavior of the extinction angle regulator in connection with the marginal current method, DC voltage regulators are used which have the desired behavior upon increases in the three-phase voltage. The DC voltage regulators, however, impair the efficiency of the DC transmission system.

The present invention is directed to the problem of developing method and circuit for transmitting DC current in which the above-mentioned disadvantages are avoided.

SUMMARY OF THE INVENTION

The present invention solves this problem by feeding an extinction-angle signal of the inverter as an input signal to a rectifier regulator.

The inventor has found that the division of functions provided in the marginal current method, namely that in normal operation the DC current is determined by the rectifier and the DC voltage is determined by the inverter, is unfavorable. In addition, the inventor has found that the extinction angle regulator at the inverter is an essential cause for the above-indicated disadvantages.

The solution proposed according to the present invention proceeds along a different path. The control angle for the rectifier is determined in steady-state operation as a function of the extinction angle. In steady-state operation, the rectifier always determines the DC voltage while the inverter determines the DC current. By the solution in accordance with the present invention, regulator detachments in quasi-steady operation are avoided.

In an embodiment of the present invention, the rectifier is controlled by a current regulator under transient operating conditions, for instance, upon start-up and/or in the event of a malfunction. This takes place if, for instance, no extinction angle actual value is present or if the actual value of the extinction angle is zero. By the structure selected for the regulator design, no regulator detachments take place in quasi-steady operation. The regulator of the rectifier which acts as extinction angle regulator no longer counteracts the current regulator of the inverter, so that it can have better dynamics. In this way, the overall dynamics of the DC transmission can be improved. Since no regulator detachments occur in quasi-steady operation and an advantageous du/dq behavior is present, the proposed method can be used not only in the case of rigid power lines but also advantageously in the case of weak power lines.

Another embodiment of the present invention uses a rectifier for producing a DC current from a alternating current. The rectifier is connected on the DC side with an inverter, which forms an alternating current (AC) from the DC current. An input of a rectifier regulator for the rectifier is connected to a signal generator of the inverter, which conducts an extinction angle signal.

All solutions indicated are suitable in particular for high-voltage DC transmission (HGÜ).

DETAILED DESCRIPTION

Figure 1:
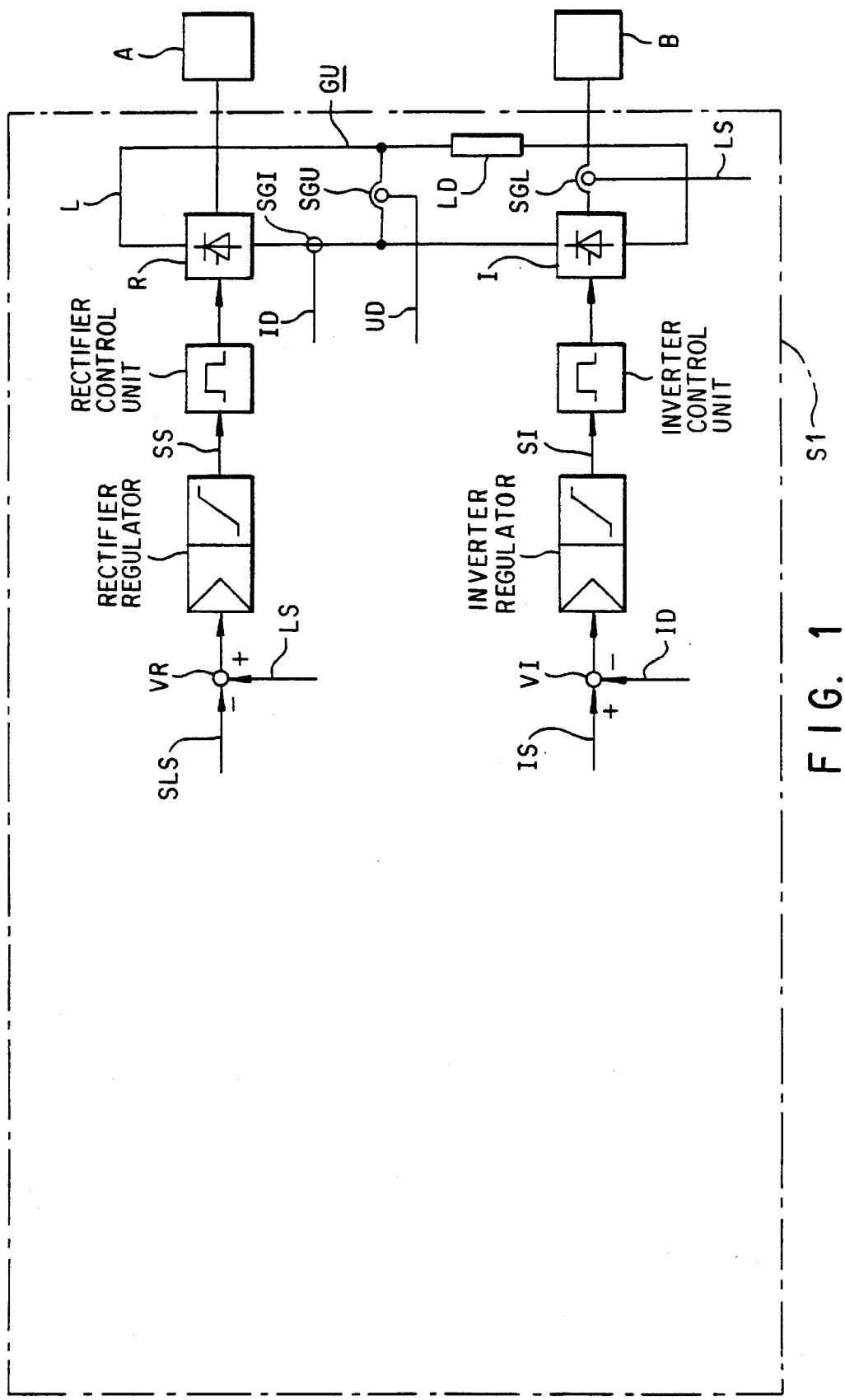
FIG. 1 shows a circuit for direct current transmission.

In the circuit S1 shown in FIG. 1 there can be noted two electric power lines A and B, which are electrically connected to each other by a dc transmission (GÜ). The power lines A and B are developed in this connection as three-phase or alternating voltage power lines which, for technical reasons, cannot or are not connected directly to each other. The power line A is connected for this purpose to a rectifier R. The rectifier R effects the rectification of the alternating energy supplied by the power line A. The outputs of the rectifier R are connected by DC lines L to an inverter I. The latter effects an inverting of the DC signal supplied by the rectifier R, which signal is then fed to the power line B. The rectifier R and the inverter I are preferably developed as a multi-pulse bridge circuit with thyristors, GTO's, or other controllable converters.

For the dampening of harmonics on the DC lines L, they have, for instance, a smoothing inductance LD. On the DC lines L there are furthermore provided signal transmitters SGI, SGU for a current signal ID and the voltage signal UD of the DC transmission GÜ. Another signal transmitter SGL is arranged on the alternating-voltage side on the inverter I which serves to determine an extinction-angle signal LS. Control units STR and STI are connected on the input side to the rectifier R and the inverter I respectively, which serve for the preparation of the firing pulse.

The control unit STR of the rectifier R receives a control signal SS from a rectifier regulator RR, to which an extinction angle signal LS is fed as input variable. Before the use as input variable (regulation variable), the extinction angle signal LS is compared in a first comparator VR with a desired extinction angle SLS. The rectifier regulator RR can in this connection comprise an amplifier, a limiter, as well as the comparator VR. The inverter I also has a series connection consisting of a second comparator VI, an inverter regulator IR, and the control unit STI for the control. In this connection, there are fed to the second comparator VI as input variables a desired current IS and the current signal of the dc transmission GÜ. In the inverter regulator IR, the corresponding control signal SI for the control unit STI is then produced from the resultant input variable.

With this circuit, the rectifier R in steady operation always determines the DC voltage on the DC transmission GÜ while the inverter I always determines the DC current. The control signal SS for the rectifier R is in this connection determined only by the rectifier regulator RR, which operates as a function of the extinction-angle signal LS. This variant is characterized by its simplicity, in connection with which a combination with other regulating methods is possible. The control signals SS, SI contain essentially the information with regard to the control angle for the converter devices.

Figure 2:
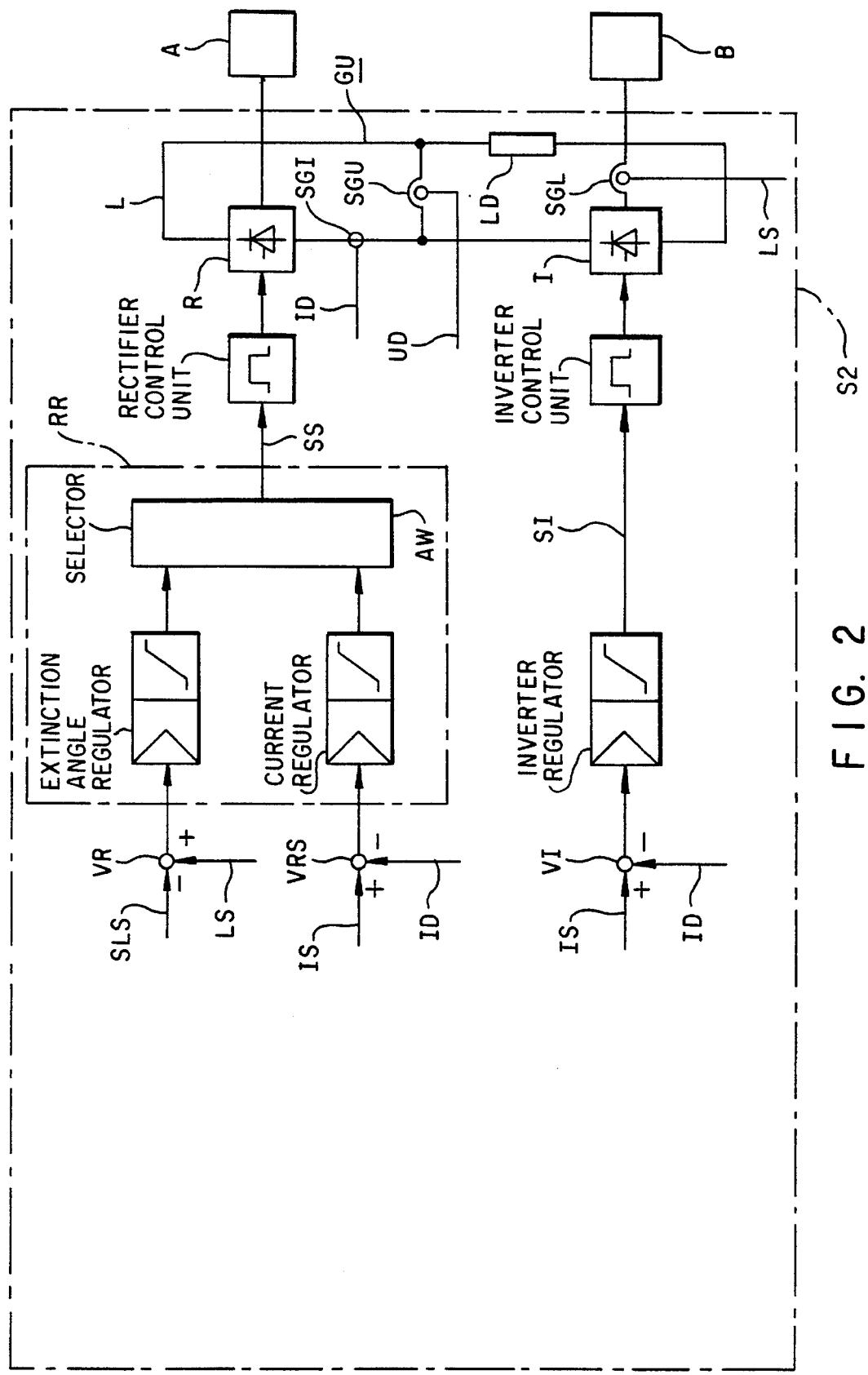
FIG. 2 shows a circuit according to FIG. 1 having a selector for start-up or malfunction.

In the circuit S2 shown in FIG. 2, the rectifier regulator RR has an extinction angle regulator LR and a current regulator SR, an input of the extinction angle regulator LR being connected to the output of the first comparator VR, and the input of the current regulator SR being connected to the output of a third comparator VRS. The associated desired and actual value signals LS and SLS and ID and IS respectively are fed as input variables to the comparators VR and VRS. The outputs of the extinction angle regulator LR and of the current regulator SR are in this connection brought to a selector AW. It has the task of further conducting the corresponding control signal SR for a predetermined case of operation to the control unit STR. In this connection, in steady-state operation, the output signal of the extinction angle regulator LR is conducted to the control unit STR. If, in the event of a malfunction or for the start-up phase of the dc transmission GÜ and therefore when still no current or a "deficiency" current is flowing on the DC lines L, the current regulator SR comes into action. The selector AW can also optionally be developed in such a manner that it acts directly on the regulator or its input variables. However, it is essential that merely only one regulator act on the rectifier R. With the circuit S2, better operation is possible, particularly upon start-up and in the event of a malfunction. The dynamic behavior is in this case considerably improved.

Figure 3:
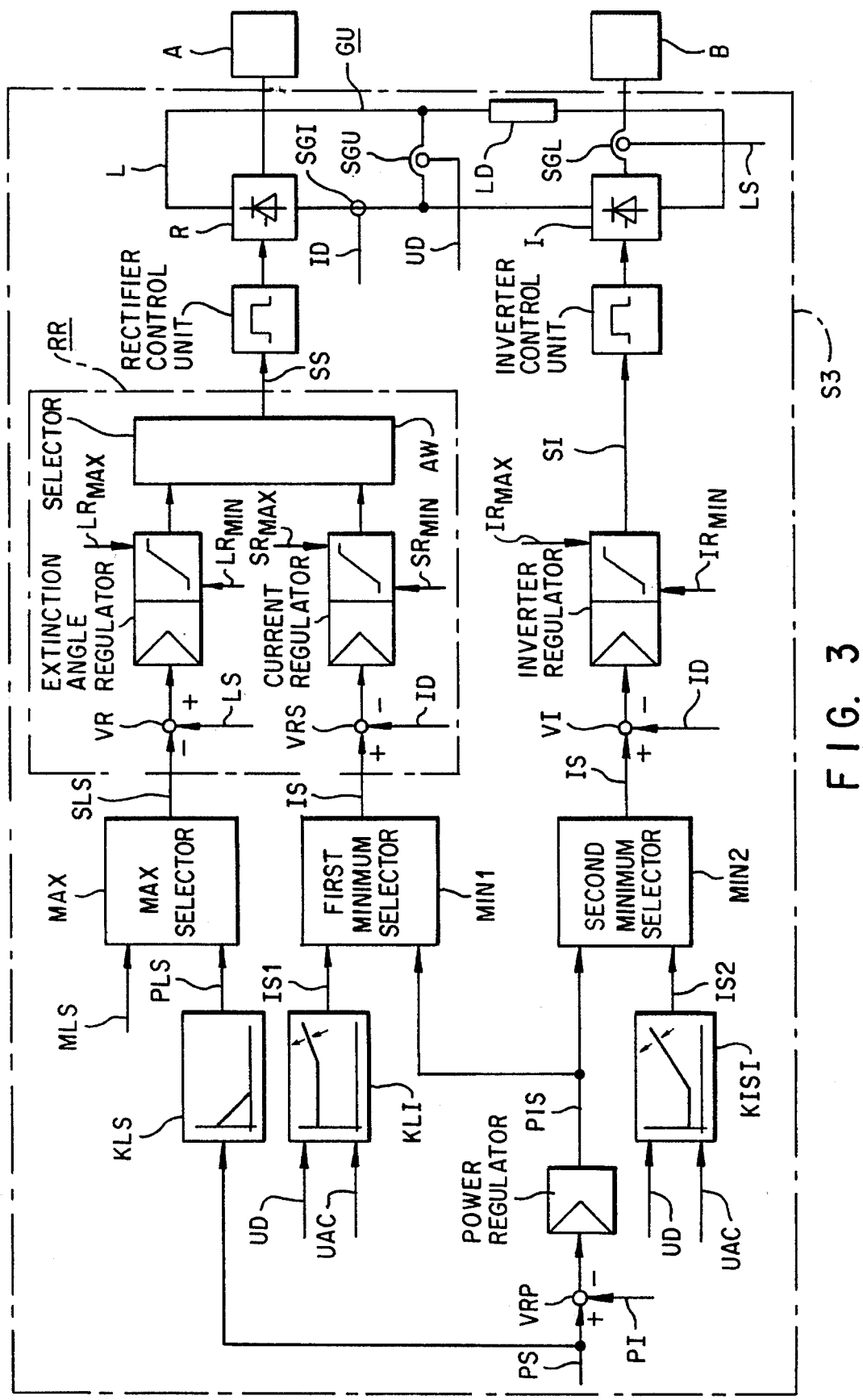
FIG. 3 shows a further development of the circuit of FIG. 2.

The circuit S3 shown in FIG. 3 represents a preferred embodiment. The essential difference between the circuit S3 and the circuit S2 shown in FIG. 2 resides therein that the processing of the desired values is shown in further detail. Starting from a predeterminable desired power value PS, this value is fed to a characteristic-curve generator in which a power dependent desired extinction angle PLS is formed. The latter is fed together with a minimal extinction angle desired value MLS to a maximum selector MAX which feeds the signal having the higher amplitude as desired extinction angle SLS to the comparator VR. In parallel to this, the power desired value PS is conducted to a fourth comparator VRP the second input of which is fed a power actual value PI of the DC transmission GÜ. This value can be formed, for instance, from the measured values UD and ID. The output of the fourth comparator VRP is connected with a power regulator RP the output of which supplies a power-dependent current desired value PIS. As a function of the voltage UD of the dc transmission GÜ and of an alternating voltage UAC (optionally from power line A or B), a first further current desired value IS is formed in a second characteristic-curve generator KLI, which value is fed to an input of a first minimum selector MIN1. The second input receives the power dependent current desired value PIS. The minimal signal in each case is fed by the minimum selector MIN1 to the second comparator VRS as current desired value IS.

The characteristic-curve generators used here are generally known. By means of them, the characteristic curve of an input variable can be varied with predetermined parameters or as a function of further input variables. The characteristic-curve generators serve in this case in particular for adaptation to the customer-specific conditions of a plant in the individual case. The signal courses shown in FIG. 3 in the characteristic-curve generators KLS, KIS, KISI therefore serve merely as examples for a special case of use.

The power-dependent current desired value PIS is furthermore fed to a second minimum selector MIN2. As a function of the voltage UD of the DC transmission GÜ and of the alternating voltage UAC, a second further current desired value IS2 is formed in a third characteristic-curve generator KISI from the power-dependent current desired value PIS, said second current desired value IS2 being fed to the second input of the minimum selector MIN2. The minimum selector MIN2 selects the minimum signal among the signals present at its inputs and conducts it, as current desired value IS, to the third comparator VI. The rest of the structure of the circuit as well as the course of the signal correspond to that shown in FIG. 2.

The method indicated as well as the supplementary construction of the circuit permit an improved operation of DC transmissions. This is true in particular to the use in the case of high-voltage DC transmissions (HGÜ systems) which are developed as short coupling. If an additional signal transmission is present, use is possible also in the case of long transmission paths.

Figure 4:
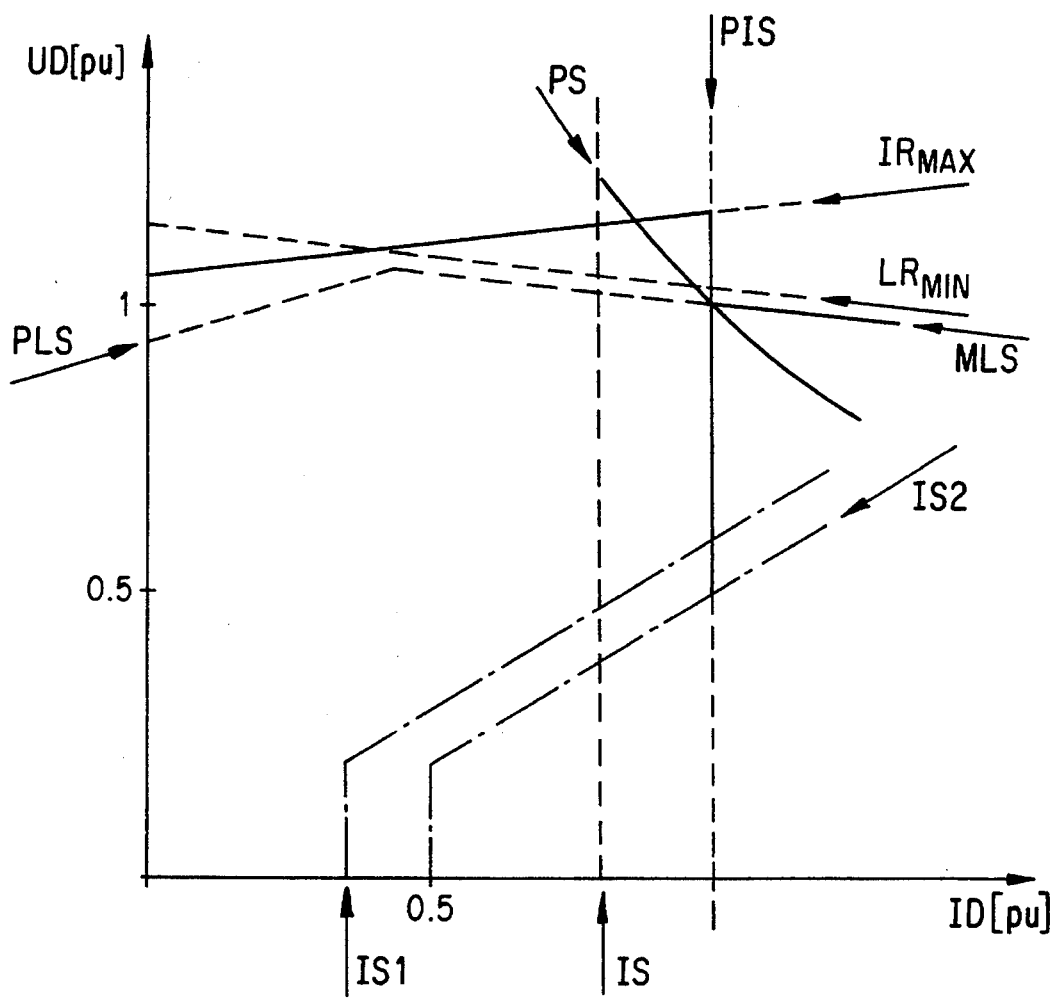
FIG. 4 is a graph for the circuit of FIG. 3.

The graph shown in FIG. 4 shows the steady-state characteristics of the method in a UD/UI graph. It can be noted from the graph that in steadystate operation the rectifier I determines the voltage UD and the inverter R determines the current ID. In the event of malfunction and for start-up, the rectifier R in addition has a current-determining characteristic. Practically no regulator detachments in quasi-steady operation occur any longer. The reduction to practice of the method is possible with the circuit arrangement indicated or else as program in a computer.

I claim:

1. A method for direct-current transmission between at least one rectifier and at least one inverter, comprising the steps of:

a) determining an extinction angle signal of the inverter; and b) feeding the extinction-angle signal of the inverter as an input signal to a rectifier regulator.

2. The method according to claim 1, further comprising the step of:

c) feeding a current signal of the direct-current transmission as an input signal to an inverter regulator.

3. The method according to claim 2, further comprising the steps of:
   d) determining a desired current of the direct-current transmission as a function of the power to be transmitted; and
   e) comparing the current signal of the direct-current transmission with the desired current before the step c) of feeding the current signal as the input signal to the inverter regulator.

4. The method according to claim 1, further comprising the steps of:
   c) feeding a current signal of the direct-current transmission as an additional input signal to the rectifier regulator during start-up and/or in the event of a malfunction; and
   d) switching between regulation of the rectifier as a function of the extinction-angle signal or regulation of the rectifier as a function of the current signal.

5. The method according to claim 4, wherein the step d) of switching further comprises selecting between outputs of an extinction-angle regulator and a current regulator, the step a) of determining the extinction angle signal further comprises providing the extinction angle signal as an output of the extinction-angle regulator, and the step c) of feeding the current signal further comprises providing the current signal as an output of the current regulator.

6. The method according to claim 4, further comprising the step of:
   e) providing the current signal of the direct-current transmission of the rectifier regulator to an alternating current regulator of the direct-current transmission.

7. The method according to claim 1, further comprising the steps of:
   c) determining a desired extinction angle as a function of the power to be transmitted; and
   d) comparing the extinction angle signal with the desired extinction angle before the step b) of feeding the extinction angle signal as the input signal to the rectifier regulator.

8. A circuit for direct-current transmission, comprising:
   a) a rectifier producing a direct current from an alternating current;
   b) an inverter forming an alternating current from the direct current, and receiving the direct current from the rectifier;
   c) a rectifier regulator being coupled to the rectifier, and having an input;
   d) a first signal generator being coupled to the inverter and providing as an output an extinction angle signal, wherein the input of the rectifier regulator is coupled to the first signal generator.

9. The circuit according to claim 8, further comprising:
   a) a second signal generator being coupled to the rectifier, and providing as an output a current signal of the direct-current transmission; and
   b) an inverter regulator being coupled to the inverter and having an input coupled with the output of the second signal generator.

10. The circuit according to claim 9, wherein the rectifier regulator further comprises:
    a) an extinction angle regulator having an input and having an output;
    b) a current regulator having an input and having an output, wherein the input of the extinction-angle regulator forms a first input of the rectifier regulator and the input of the current regulator forms a second input of the rectifier regulator, and the rectifier regulator is coupled to the second signal generator; and
    c) a selector actively switching between the extinction angle regulator and the current regulator, whereby the output of the rectifier regulator is switched between the current signal and the extinction angle.

11. The circuit according to claim 10, further comprising a control device for the rectifier, wherein the selector is coupled to the output of the extinction angle regulator and the selector is coupled to the output of the current regulator, whereby for a predetermined type of control, the selector switches either the output of the extinction angle regulator or the output of the current regulator to the control device of the rectifier.

12. The circuit according to claim 10, further comprising a first comparator receiving as inputs the extinction angle signal and a desired extinction angle, and providing a difference between the extinction angle signal and the desired extinction angle as an output, wherein the input of the extinction angle regulator is coupled to the output of the first comparator.

13. The circuit according to claim 10, further comprising a second comparator receiving as inputs the current signal of the direct-current transmission and a desired current, and providing a difference between the current signal and the desired current as an output, wherein the input of the current regulator is coupled to the output of the second comparator, and the desired current is formed as a function of a power to be transmitted on the direct-current transmission.

14. The circuit according to claim 9, wherein the second signal generator providing the current signal of the direct-current transmission for the inverter regulator is coupled to the rectifier regulator and provides the current signal of the direct current transmission to the rectifier regulator.

* * * * *